United States Patent
Cho et al.

(10) Patent No.: US 8,045,991 B2
(45) Date of Patent: Oct. 25, 2011

(54) METHOD AND APPARATUS FOR TRANSMITTING AND RECEIVING COMMON CHANNEL IN A CELLULAR WIRELESS COMMUNICATION SYSTEM SUPPORTING SCALABLE BANDWIDTH

(75) Inventors: Joon-Young Cho, Suwon-si (KR); Ju-Ho Lee, Suwon-si (KR); Kyeong-In Jeong, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1271 days.

(21) Appl. No.: 11/655,765

(22) Filed: Jan. 19, 2007

(65) Prior Publication Data

US 2007/0190967 A1   Aug. 16, 2007

(30) Foreign Application Priority Data

| Jan. 19, 2006 | (KR) | 10-2006-0006030 |
| Feb. 9, 2006 | (KR) | 10-2006-0012618 |
| Jun. 23, 2006 | (KR) | 10-2006-0057143 |
| Aug. 2, 2006 | (KR) | 10-2006-0073040 |

(51) Int. Cl.
- *H04W 72/00* (2009.01)
- *H04M 11/00* (2006.01)
- *H04J 3/06* (2006.01)
- *H04J 11/00* (2006.01)

(52) U.S. Cl. ........ 455/450; 455/403; 370/350; 370/203; 370/206

(58) Field of Classification Search .......... 455/450, 455/403; 370/350, 203, 206
See application file for complete search history.

(56) References Cited

U.S. PATENT DOCUMENTS

| 6,925,067 | B2 | 8/2005 | Jou | |
| 2005/0094550 | A1* | 5/2005 | Huh et al. | 370/203 |
| 2005/0163238 | A1 | 7/2005 | Fujii | |
| 2005/0286611 | A1* | 12/2005 | Priotti | 375/144 |
| 2007/0098053 | A1* | 5/2007 | Rinne et al. | 375/149 |
| 2007/0116094 | A1* | 5/2007 | Parts et al. | 375/130 |
| 2007/0140106 | A1* | 6/2007 | Tsai et al. | 370/208 |
| 2009/0219883 | A1 | 9/2009 | Cho et al. | |

FOREIGN PATENT DOCUMENTS

| KR | 1020010110801 | 12/2001 |
| KR | 1020070039760 | 4/2007 |
| KR | 1020070076248 | 7/2007 |

* cited by examiner

*Primary Examiner* — Dwayne Bost
*Assistant Examiner* — Ariel Balaoing
(74) *Attorney, Agent, or Firm* — The Farrell Law Firm, P.C.

(57) ABSTRACT

A method is provided for transmitting a common channel in a cellular communication system that supports a scalable system bandwidth and uses multiple access technology. The transmission method includes determining a system bandwidth of a cell by comparing a reception bandwidth of User Equipments (UEs) located in the cell with the system bandwidth; mapping a first synchronous channel (SCH) sequence to a central band of a system band, which has a bandwidth which is greater than or equal to a minimum bandwidth required for detecting an SCH; if the system bandwidth is greater than twice the reception bandwidth, additionally mapping second SCH sequences to bands having the minimum bandwidth, each of which is spaced from the central band by a predetermined interval; and transmitting to the UEs located in the cell a signal in the frequency domain to which at least one of the first SCH sequence and the second SCH sequences is mapped.

26 Claims, 15 Drawing Sheets

US 8,045,991 B2

METHOD AND APPARATUS FOR TRANSMITTING AND RECEIVING COMMON CHANNEL IN A CELLULAR WIRELESS COMMUNICATION SYSTEM SUPPORTING SCALABLE BANDWIDTH

PRIORITY

This application claims priority under 35 U.S.C. §119(a) of a Korean Patent Application filed in the Korean Intellectual Property Office on Jan. 19, 2006 and assigned Serial No. 2006-6030, a Korean Patent Application filed in the Korean Intellectual Property Office on Feb. 9, 2006 and assigned Serial No. 2006-12618, a Korean Patent Application filed in the Korean Intellectual Property Office on Jun. 23, 2006 and assigned Serial No. 2006-57143, and a Korean Patent Application filed in the Korean Intellectual Property Office on Aug. 2, 2006 and assigned Serial No. 2006-73040, the entire disclosure of all of which is incorporated herein by reference.

BACKGROUND OF THE INVENTION

1. Field of the Invention

The present invention relates generally to a cellular wireless communication system, and in particular, to a method and apparatus for transmitting and receiving downlink common channels in a communication system using Orthogonal Frequency Division Multiplexing (OFDM) technology.

2. Description of the Related Art

Recently, OFDM technology has generally been used for broadcast and mobile communication systems. OFDM technology has an advantage of canceling interference between multipath signal components existing in a wireless communication channel and guaranteeing orthogonality between multiple access users, and enables efficient use of frequency resources. Accordingly, the OFDM technology is useful for high-speed data transmission and wideband systems, compared with Direct Sequence Code Division Multiple Access (DS-CDMA) technology such as Wideband CDMA (WCDMA) and CDMA2000.

FIG. 1 illustrates the structure of an OFDM signal in the Frequency-Time domain.

Referring to FIG. 1, one OFDM symbol 100 occupies N subcarriers 102 in the frequency domain. The subcarriers 102 are simultaneously transmitted in parallel along with modulation symbols (or called subcarrier symbols) 104 corresponding to transmission information. OFDM technology, which is multi-carrier transmission technology, independently transmits individual transmission data and control information with several subcarriers in parallel.

In the cellular wireless communication system, for demodulation of received data and control information, synchronization and cell search should first be performed between a transmitter (Node B or cell) and a receiver (User Equipment (UE)). OFDM-based cellular wireless communication system can also use the cell search method similar to that used in the WCDMA system. A cell search procedure in the OFDM-based system can also include three steps, like that in the WCDMA system.

In a first step, the cell search procedure performs symbol timing synchronization for detecting start points 106 and 108 of each OFDM symbol. In a second step, the cell search procedure detects a group index of a scrambling sequence used for transmission of a downlink channel, along with frame timing synchronization for detecting a start point of an OFDM frame composed of a plurality of OFDM symbols. In a third step, the cell search procedure finally detects a cell-specific scrambling code belonging to a scrambling sequence group indicated by the group index. In this way, a UE can acquire frame timing synchronization and scrambling code of its cell, and then demodulate received data and control channels.

One of the most important features in the OFDM-based cellular wireless communication system is support of scalable bandwidth. The scalable bandwidth-based system can have system bandwidths of, for example, 20/15/10/5/2.5/1.25 MHz. Service providers can provide services using a selected one of the bandwidths, and there may exist several types of UEs including a UE capable of supporting a service having a maximum of a 20-MHz reception bandwidth and a UE capable of supporting only the 1.25-MHz reception bandwidth.

The important task in the scalable bandwidth-based system is to allow a UE that first accesses the system to succeed in the cell search without information on the system bandwidth. For the system synchronization and cell search, a Synchronous Channel (SCH) composed of sequences known between the system and the receiver is used.

FIG. 2 illustrates frequency resource mapping for SCHs according to system bandwidth in a system supporting a typical scalable bandwidth.

Referring to FIG. 2, a horizontal axis 200 indicates a frequency domain, and an SCH 204 has a 1.25-MHz bandwidth regardless of system bandwidth and is transmitted at the center of the system band. Therefore, a UE finds a Radio Frequency (RF) carrier 202, which is the center frequency of the system band, regardless of the system bandwidth, and performs cell search on the 1.25-MHz central band having the RF carrier 202 as its center, thereby detecting the SCH 204 and acquiring initial synchronization for the system.

FIG. 3 illustrates an SCH whose transmission bandwidth differs according to system bandwidth. That is, for the system bandwidths 300 which are less than or equal to 2.5 MHz, SCHs 302 are transmitted with a 1.25-MHz bandwidth, and for the system bandwidths 306 which are greater than or equal to 5 MHz, SCHs 304 are transmitted with a 5-MHz bandwidth. The main reason for transmitting the SCHs in this way is to transmit SCHs using a broad band in a system with broad system bandwidth, thereby improving the cell search performance.

Another important task in the system supporting the scalable bandwidth is support of smooth handover. When a UE is located in a cell boundary and its reception power from its current cell is insufficient, the UE needs to handover to a neighboring cell with higher reception power. To this end, it is important to design SCHs of cells such that a UE having a lower reception bandwidth than the system band can smoothly perform cell search for SCHs of neighboring cells even when it is receiving service in a partial band of the system. For similar reasons, there is a need to design the other common channels such as Broadcast Channel (BCH) and Paging Channel (PCH), such that the UE can smoothly access the common channels.

SUMMARY OF THE INVENTION

An object of the present invention is to address at least the problems and/or disadvantages and to provide at least the advantages described below. Accordingly, an object of the present invention is to provide an SCH transmission/reception method and apparatus for allowing a UE located in a cell boundary to smoothly perform cell search for a neighboring cell in a system supporting scalability of system bandwidth and the UE reception bandwidth.

Another object of the present invention is to provide an SCH transmission/reception method and apparatus for smoothly performing neighboring cell search in a handover situation without reducing initial cell search performance.

A further object of the present invention is to provide a method and apparatus for allowing all UEs in a system to receive common channels with a constant bandwidth regardless of the system bandwidth, while maintaining constant overhead of SCHs or common channels such as a BCH and a PCH.

According to one aspect of the present invention, there is provided a method for transmitting a common channel in a cellular communication system that supports a scalable system bandwidth and uses multiple access technology. The transmission method includes determining a system bandwidth of a cell by comparing the reception bandwidth of User Equipments (UEs) located in the cell with the system bandwidth; mapping a first synchronous channel (SCH) sequence to a central band of a system band, which has a bandwidth which is greater than or equal to a minimum bandwidth required for detecting an SCH; if the system bandwidth is greater than double of the reception bandwidth, additionally mapping second SCH sequences to bands having the minimum bandwidth, each of which is spaced from the central band by a predetermined interval; and transmitting a signal in the frequency domain to which at least one of the first SCH sequence and the second SCH sequences is mapped, to the UEs located in the cell.

According to another aspect of the present invention, there is provided a method for receiving a common channel in a cellular communication system that supports a scalable system bandwidth and uses multiple access technology. The reception method includes determining a system bandwidth of a cell where a User Equipment (UE) is currently located, by comparing its reception bandwidth with the system bandwidth if the system bandwidth is less than twice the reception bandwidth or the UE is camping in a central reception band of the system band, which has the reception bandwidth; receiving a first synchronous channel (SCH) signal through the central band of the system band, which has a bandwidth that is greater than or equal to a minimum bandwidth required for detecting an SCH if the system bandwidth is greater than or equal to twice the reception bandwidth and the UE is camping in an upper or lower band which is a part of the system band; receiving a second SCH signal through a band that is spaced from the central band of the system band by a predetermined interval and has the minimum bandwidth; and acquiring an SCH sequence from any one of the first and second SCH signals.

According to a further aspect of the present invention, there is provided an apparatus for transmitting a common channel in a cellular communication system that supports a scalable system bandwidth and uses multiple access technology. The transmission apparatus includes a controller for determining a system bandwidth of a cell by comparing a reception bandwidth of User Equipments (UEs) located in the cell with the system bandwidth; a synchronous channel (SCH) subcarrier symbol generator for generating a first or second SCH sequence composed of a plurality of SCH subcarrier symbols according to the system bandwidth; a subcarrier symbol mapper for mapping the first SCH sequence to a central band of the system band, which has a bandwidth that is greater than or equal to a minimum bandwidth required for detecting an SCH, and additionally mapping second SCH sequences to bands that are spaced from the central band by a predetermined interval and have the minimum bandwidth, if the system bandwidth is greater than twice the reception bandwidth; and an Inverse Fast Fourier Transform (IFFT) unit for transmitting a signal in the frequency domain to which at least one of the first SCH sequence and the second SCH sequences is mapped, to the UEs located in the cell.

According to still another aspect of the present invention, there is provided an apparatus for receiving a common channel in a cellular communication system that supports a scalable system bandwidth and uses multiple access technology. The reception apparatus includes a Radio Frequency (RF) unit for receiving a radio signal in a reception band where a User Equipment (UE) is camping; a frequency converter for down-converting the radio signal into an intermediate frequency (IF) or a baseband signal; a reception filter controller for determining the system bandwidth of a cell where the UE is currently located, by comparing a reception bandwidth of the UE with the system bandwidth; a band-limited filter for receiving a first synchronous channel (SCH) signal through the central band of the system band, which has a bandwidth that is greater than or equal to a minimum bandwidth required for detecting an SCH, if the system bandwidth is less than twice the reception bandwidth or the UE is camping in a central reception band of the system band, which has the reception bandwidth, and receiving a second SCH signal through a band that is spaced from the central band of the system band by a predetermined interval and has the minimum bandwidth, by filtering the down-converted signal if the system bandwidth is greater than or equal to twice the reception bandwidth and the UE is camping in an upper or lower band which is a part of the system band; and a cell searcher for acquiring an SCH sequence from any one of the first and second SCH signals, and performing cell search using the SCH sequence.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, detailed description of known functions and configurations incorporated herein has been omitted for clarity and conciseness.

The present invention efficiently arranges bands where Synchronous Channels (SCHs) or common channels such as Broadcast Channel (BCH) and Paging Channel (PCH) are located in the system band in a cellular communication system that uses multiple access technology and supports scalable bandwidth.

Although preferred embodiments of the present invention will herein be described in detail with reference to Orthogonal Frequency Division Multiplexing (OFDM) transmission technology-based system and its channels, it will be understood by those skilled in the art that the gist of the present invention can be applied to other communication systems having similar technical background and channel formats without departing from the spirit and scope of the invention.

Figure 4:
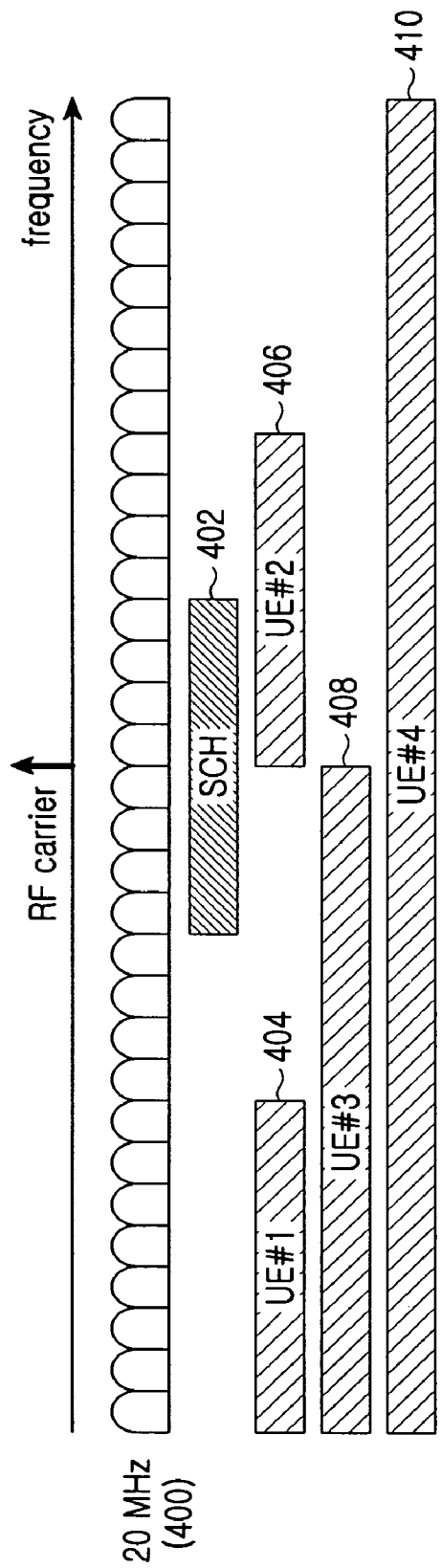
FIG. 4 illustrates an example where UEs with various reception bandwidths are assigned in the whole system band.

One of the key features of the system supporting scalable bandwidth, being different from those of the existing system, is that various User Equipments (UEs) having different reception bandwidth capabilities exist in the system. For example, FIG. 4 shows a situation where UEs with 5/10/20-MHz bandwidths, identified as, UE#1 (404), UE#2 (406), UE#3 (408) and UE#4 (410), receive services from a system with a 20-MHz system bandwidth 400. Reference numeral 402 denotes an SCH transmitted from the system.

Referring to FIG. 4, SCH 402 is transmitted with a 5-MHz bandwidth on the basis of a Radio Frequency (RF) carrier, which is the center frequency of the system band of all the cells within the system. UEs 404, 406, 408 and 410 are receiving data services in their allocated bands of their current cells after completing cell search with the use of SCH 402. The reason why UEs 404, 406, 408 and 410 camp at different bands in the whole system band 400 is to prevent frequency resource requests from concentrating in a particular band, by uniformly distributing bands used by UEs 404, 406, 408 and 410 in the system band 400.

In the situation of FIG. 4, UE#2 (406), UE#3 (408) and UE#4 (410) can receive the whole or a part of SCH 402 transmitted from a neighboring cell, but UE#1 (404) cannot receive SCH 402 because it is located in a frequency band where SCH 402 is not transmitted. Therefore, in order to allow UE#1 (404) to receive SCH 402 from the neighboring cell, an agreement on the cell search time for the neighboring cell should be made between the system and UE#1 (404). That is, in order to detect SCH 402 transmitted from the neighboring cell, UE#1 (404) should stop receiving from the current cell for the cell search time, and change the reception RF carrier to a Frequency band where SCH 402 is transmitted. In this case, UE#1 (404) can receive no information or data for the cell search time, causing deterioration in the call quality.

In the existing systems such as WCDMA and CDMA2000, when a UE performs cell search for another cell in the same system, it can freely perform cell search without an agreement on the neighboring cell search time with the system.

Preferred embodiments of the present invention allow a UE to perform neighboring cell search without affecting the call quality in the system supporting scalable bandwidth, and present SCH mapping so as not to affect the cell search performance at the time that the UE first accesses the system. The present invention provides the band and bandwidth for transmitting SCHs, when the bands used by UEs are scattered in the system band in the situation where the minimum reception bandwidth of UEs capable of accessing the system is fixed.

Specifically, preferred embodiments of the present invention transmit SCH sequences at the center of the system band, when the system bandwidth is less than or equal to twice the reception bandwidth of UEs. However, when the system bandwidth is greater than twice the reception bandwidth of UEs, the preferred embodiments transmit at least 3 SCH sequences. Of the 3 SCH sequences, one SCH sequence is transmitted at the center of the system band, and additional SCH sequences are transmitted such that they are spaced from the center of the system band by a predetermined interval and thus they do not overlap the SCH sequence that is transmitted at the center of the system band. That is, the additional SCH sequences are arranged in the bands, which are spaced from the SCH sequence for the center by the predetermined interval. The 3 SCH sequences are arranged in the system band in such a way that a UE using the reception bandwidth allocated in the system band may receive sequences corresponding to the same bandwidth (i.e. the minimum bandwidth, for example, 1.25 MHz, necessary for detecting SCHs) among the 3 SCH sequences, regardless of the system bandwidth.

Figure 5:
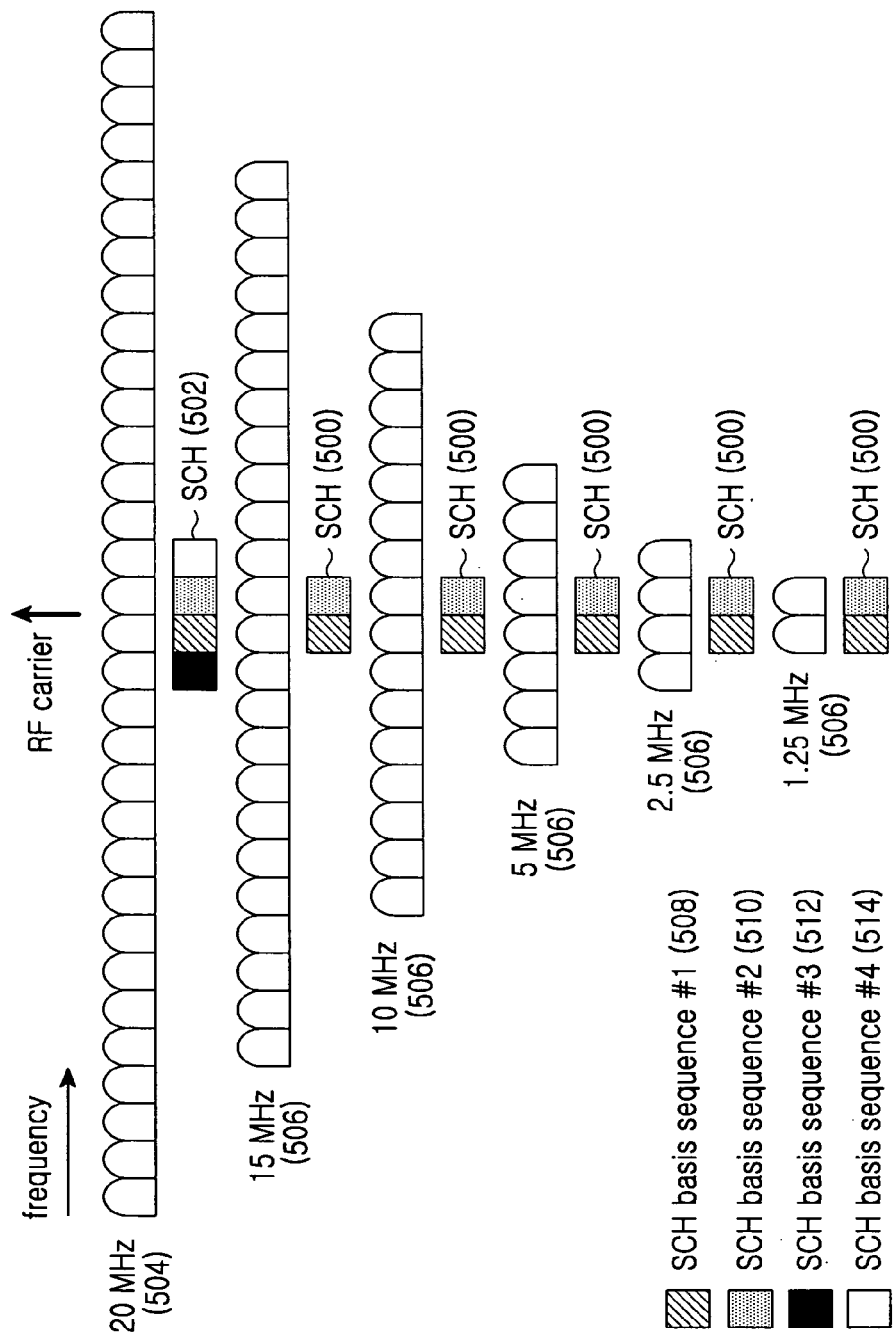
FIG. 5 illustrates Frequency domain mapping for an SCH according to the present invention.

Referring to FIG. 5, the reception bandwidth of a UE, allowed in the system band, is 10 MHz in minimum. For the 20-MHz system bandwidth, the UE can have a reception bandwidth of 10/15/20 MHz. If the system bandwidth is less than 10 MHz, the whole system band is allocated as a reception band of the UE. In addition, each UE basically needs to receive SCH sequences corresponding to 1.25-MHz bandwidth. That is, the minimum bandwidth needed by the UE for detecting an SCH is 1.25 MHz. To this end, a transmitter (Node B or cell) transmits an SCH sequence known to the UE over a 1.25-MHz band.

Figure 2:
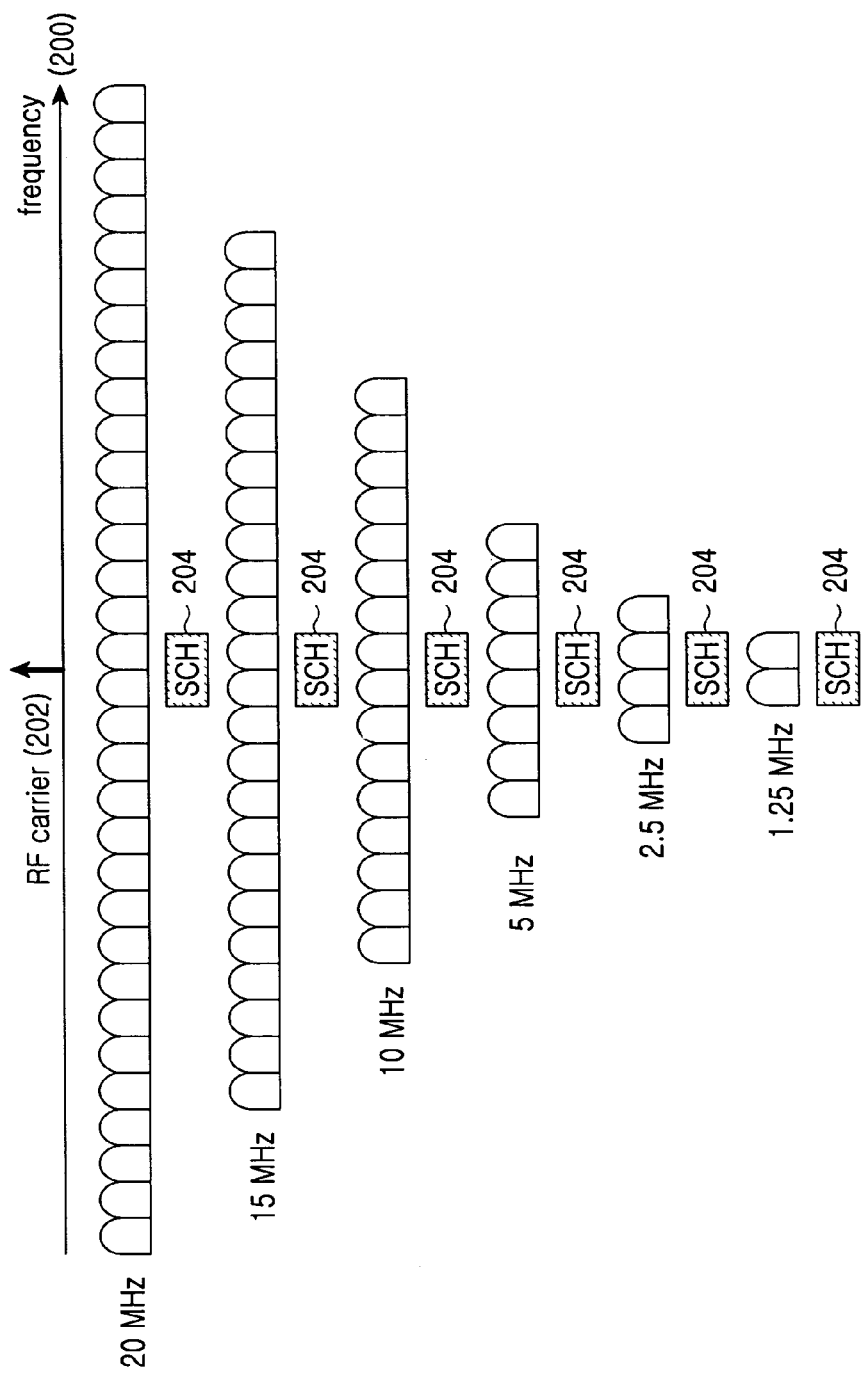
FIG. 2 illustrates frequency resource mapping for SCHs in a system supporting a typical scalable bandwidth.
Figure 3:
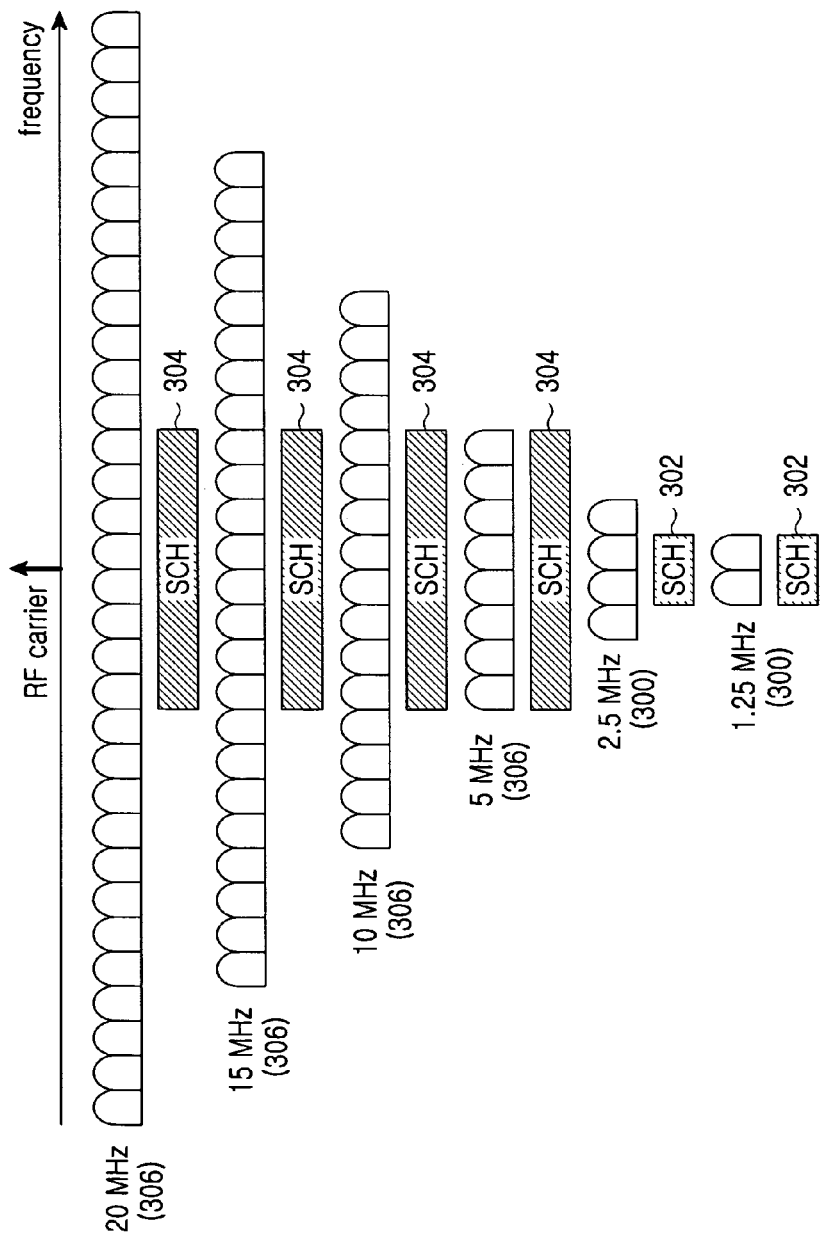
FIG. 3 illustrates an SCH whose transmission bandwidth differs according to system bandwidth.

The SCH mapping of FIG. 5 is different from the exiting SCH mapping shown in FIGS. 2 and 3, in that SCHs 500 with the same 1.25-MHz bandwidth are used in the system bandwidths 506 which are less than or equal to 15-MHz bandwidth, and SCHs 502 with 2.5-MHz bandwidth are used in the 20-MHz system band 504. The reason for differently allocating the bandwidths of the SCHs according to system bandwidths is to guarantee the same neighboring cell search performance by maintaining the constant bandwidth of the SCH that each UE actually receives, when UEs that have succeeded in initial synchronization acquisition receive SCHs from a neighboring cell.

Reference numerals 508, 510, 512 and 514 denote basis sequences used for an SCH in the Frequency domain. Of the four basis sequences 508 to 514, at least 2 basis sequences are concatenated into one SCH sequence 500 or 502 corresponding to the system bandwidth. If SCH sequences 500 and 502 indicate specific sequences having a length corresponding to SCH bandwidth, for example, Generalized Chirp-Like (GCL) sequence, Zadoff-Chu sequence, m-sequence and the like, sequences 508 to 514 correspond to the sequences obtained by dividing SCH sequences 500 and 502 into two or four parts according to the band in which the SCH sequences 500 and 502 are transmitted.

Figure 1:
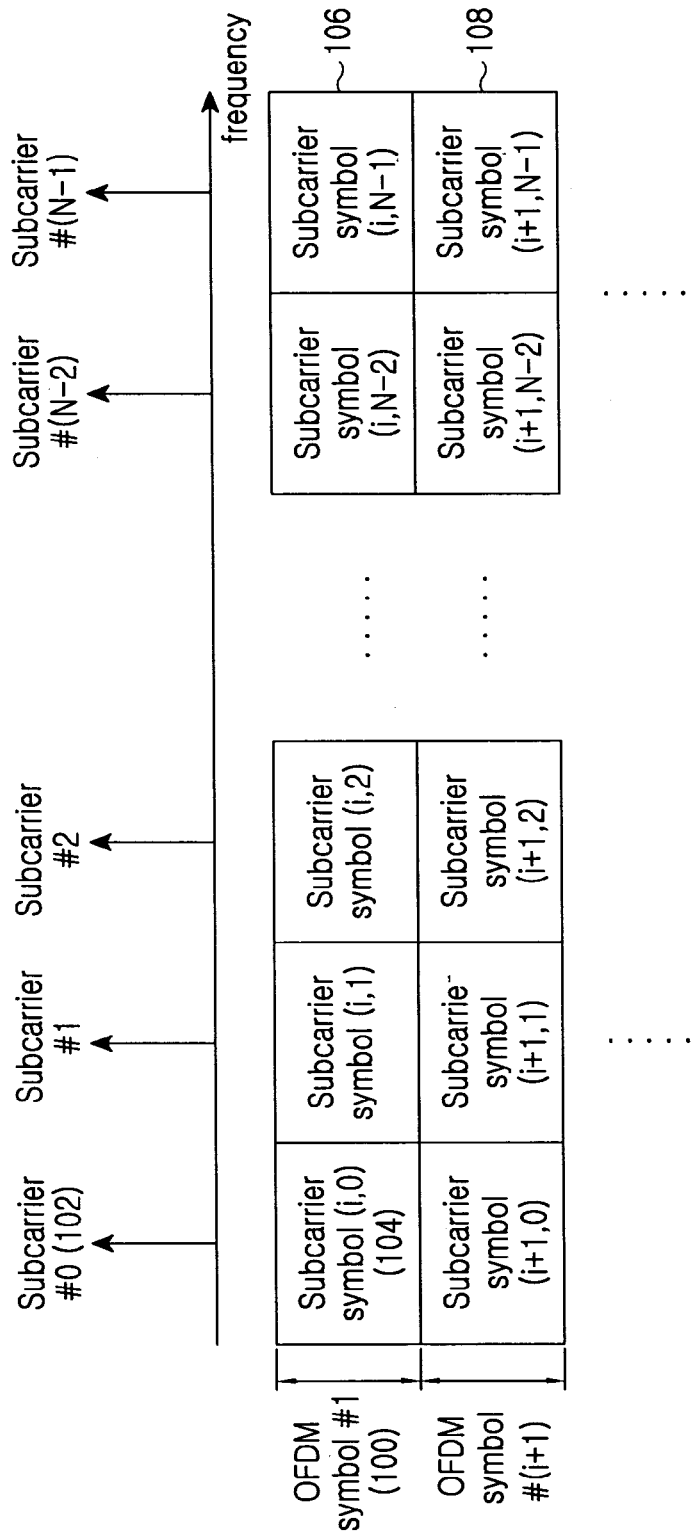
FIG. 1 illustrates the structure of an OFDM signal in the Frequency-Time domain.

As can be seen from the Frequency-domain structure of the OFDM symbol shown in FIG. 1, SCH subcarrier symbols constituting each of the basis sequences are transmitted on subcarriers in the corresponding mapped 0.625-MHz sub-band. As can be seen in FIG. 5, two basis sequences 508 and 510 are used in all system bandwidths, and transmitted in the central 1.25-MHz band of the whole system band. The other two basis sequences 512 and 514 are additionally used in the 20-MHz system bandwidth, and are arranged in 0.625-MHz sub-bands adjacent to the sequences 508 and 510 arranged in the central band, or arranged 0.625-MHz sub-bands which are spaced from the sequences 508 and 510 by a predetermined interval.

Figure 6:
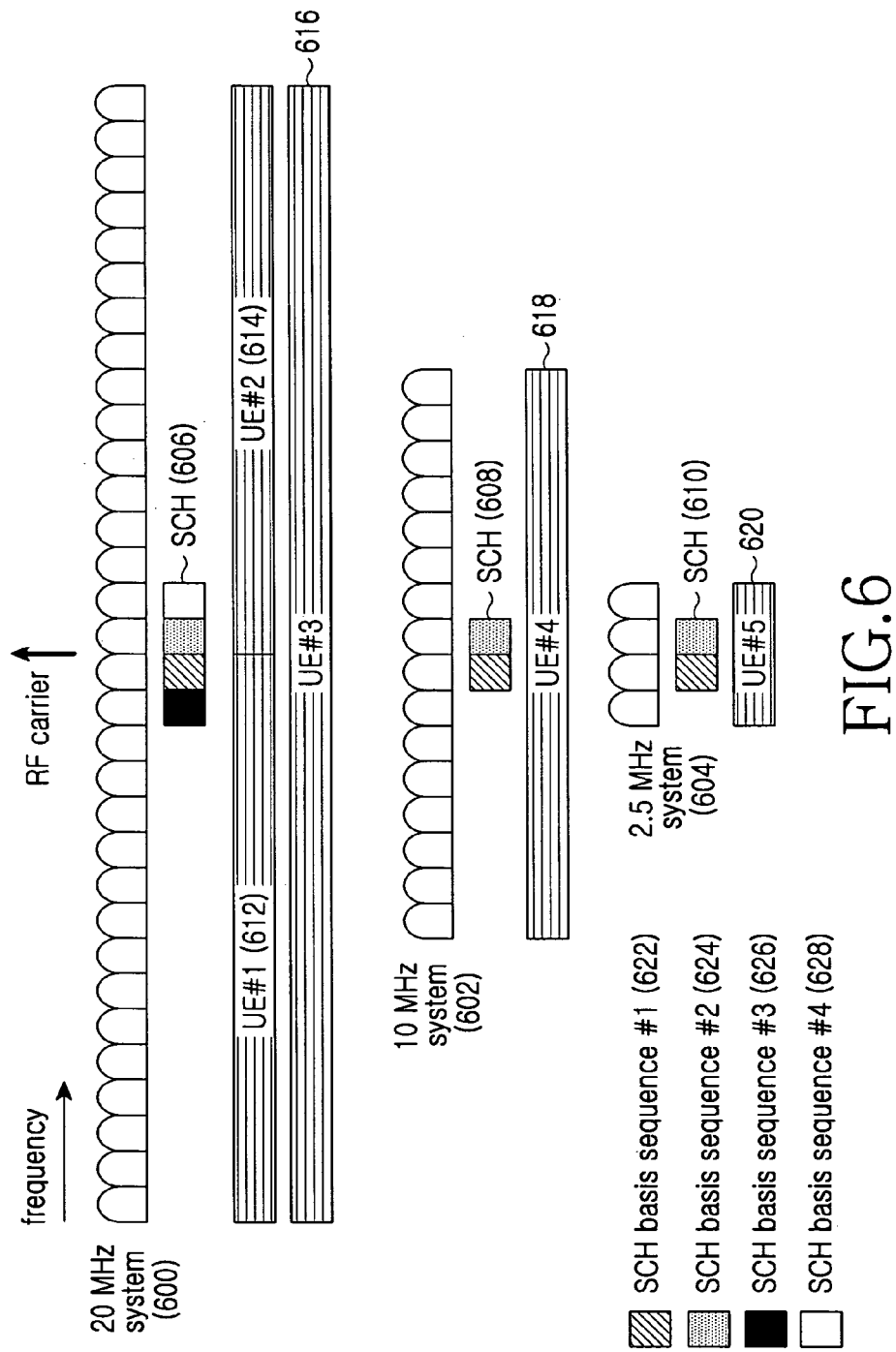
FIG. 6 illustrates an example where a plurality of UEs are assigned in the system bandwidth under the SCH structure according to the present invention.

FIG. 6 illustrates a situation where UEs having at least a 10-MHz reception bandwidth, for example, UE#1 (612), UE#2 (614), UE#3 (616) and UE#4 (618), exist in each of a 20-MHz system bandwidth 600, a 10-MHz system bandwidth 602 and a 2.5-MHz system bandwidth 604. A UE#5 (620) uses the whole 2.5-MHz system band as its reception band, because it is located in the system having the 2.5-MHz system bandwidth.

In the SCH structure of FIG. 4, UE#1 (404) can never receive an SCH of a neighboring cell, i.e. the SCH sequence 402. However, in the SCH structure of FIG. 6, all UEs 612 to 618 can receive SCHs corresponding to at least 1.25-MHz bandwidth. Specifically, UE#1 (612) that has a 10-MHz reception bandwidth and is camping in the lower half band of the 20-MHz system band, receives two basis sequences 626 and 622 in an SCH 606 from a neighboring cell and performs cell search using them, and UE#2 (614) that has a 10-MHz reception bandwidth and is camping in a higher half band, receives two basis sequences 624 and 628 from a neighboring cell and performs cell search using them.

UE#3 (616) that has a 20-MHz reception bandwidth and is camping in the whole system band, can obtain much better synchronization and cell search performance than UE#1 (612) and UE#2 (614), as it can receive all basis sequences 622 to 628 of SCH 606 from the neighboring cell. UE#4 (618) and UE#5 (620) which are located in the cells having a 10-MHz system band and a 2.5-MHz system band, respectively, receive the basis sequences 622 and 624 of the SCHs 608 and 610 with 1.25-MHz band from the neighboring cell, and perform cell search using them, because they have reception bandwidths covering the whole corresponding system band.

As can be seen from the example of FIG. 6, the UE has difficulty in performing cell search for the neighboring cell, when the system bandwidth is greater than the reception bandwidth of the UE. When the UE exists in the system having the system bandwidth greater than its reception bandwidth as shown in FIG. 4, to prevent the UE from receiving the SCH sequences at all from the neighboring cell or to prevent the UE from receiving sequences corresponding only to the bandwidth less than the minimum bandwidth necessary for detecting the SCH, it is important to have smooth neighboring cell search, and this is an important factor that can be considered for designing SCHs.

In order to prevent this problem, the UE transmits an SCH in at least a part of its reception band in case that UEs with the minimum allowable reception bandwidth are uniformly arranged in the whole system band 600. Specifically, by transmitting two basis sequences 626 and 622 each having 0.625-MHz bandwidth in the uppermost region of the band allocated to UE#1 (612), UE#1 (612) can receive a 1.25-MHz SCH from the neighboring cell in the tuned lower half band. Further, by transmitting two basis sequences 624 and 628 each having a 0.625-MHz bandwidth in the lowermost region of the band allocated to UE#2 (614), UE#2 (614) can also receive a 1.25-MHz SCH from the neighboring cell in the tuned upper half band.

In the SCH structures of FIGS. 5 and 6, a UE searches for SCH sequences 508 and 510; 622 and 624 transmitted in the 1.25-MHz band having an RF carrier as the center, which is already known when it performs initial cell search. Therefore, the UE can successfully perform cell search even though it has no information on the system bandwidth of the cell that it currently desires to access. As a result, the SCH structures of FIGS. 5 and 6 allow the UE to perform smooth neighboring cell search in the handover situation, without causing any problem in the initial cell search.

Another embodiment implements an SCH structure for the case where an allowable minimum bandwidth of a UE is 5 MHz. This embodiment, like the previous one, maps SCHs to frequency resources so that for the 10/15/20-MHz system bandwidths, the UE can receive the constant-bandwidth SCH from a neighboring cell. It is assumed herein that each UE basically needs to receive an SCH with a 1.25-MHz bandwidth.

Figure 7:
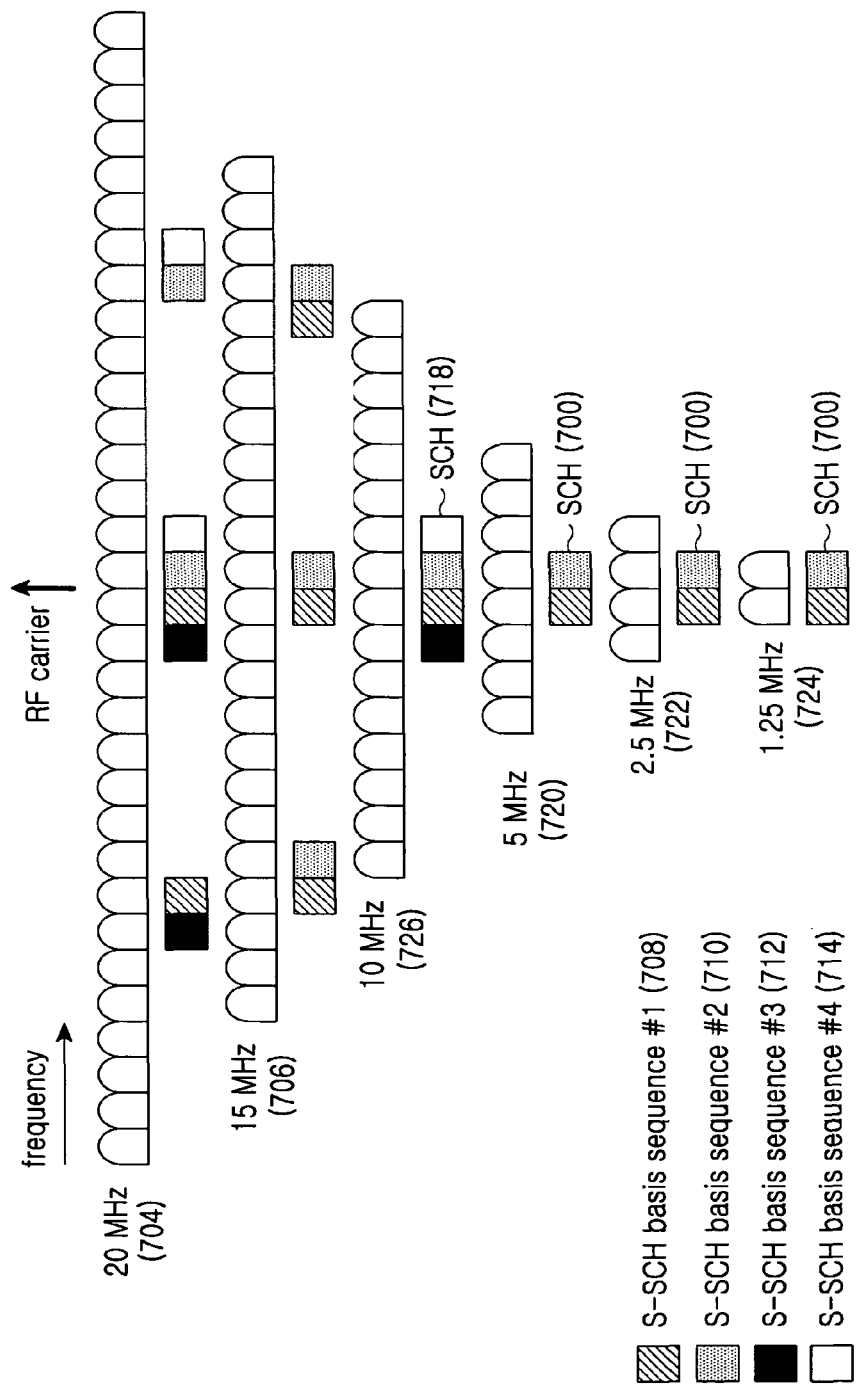
FIG. 7 illustrates Frequency resource mapping for SCHs according to the present invention.

Referring to FIG. 7, for the system bandwidths 720, 722 and 724 which are less than or equal to 5 MHz, a UE uses the whole system band as its reception band. For the system bandwidths 720, 722 and 724 which are less than or equal to the 5-MHz minimum bandwidth of the UE, the UE can receive an SCH from a neighboring cell, because an SCH 700 composed of two basis sequences 708 and 710 is transmitted using the central 1.25-MHz band of the system band.

For the UEs having reception bandwidths which are less than or equal to a half of the system bandwidth, at least two basis sequences i.e. 712 and 714; 708 and 710; 712 and 714; and 708 and 710 are transmitted in addition to the two basis sequences 708 and 710 of the central 1.25-MHz band for system bandwidths 704, 706 and 726 which are greater than or equal to 10 MHz. For all system bandwidths 704 to 724, the same basis sequences are transmitted in the same position.

Figure 8:
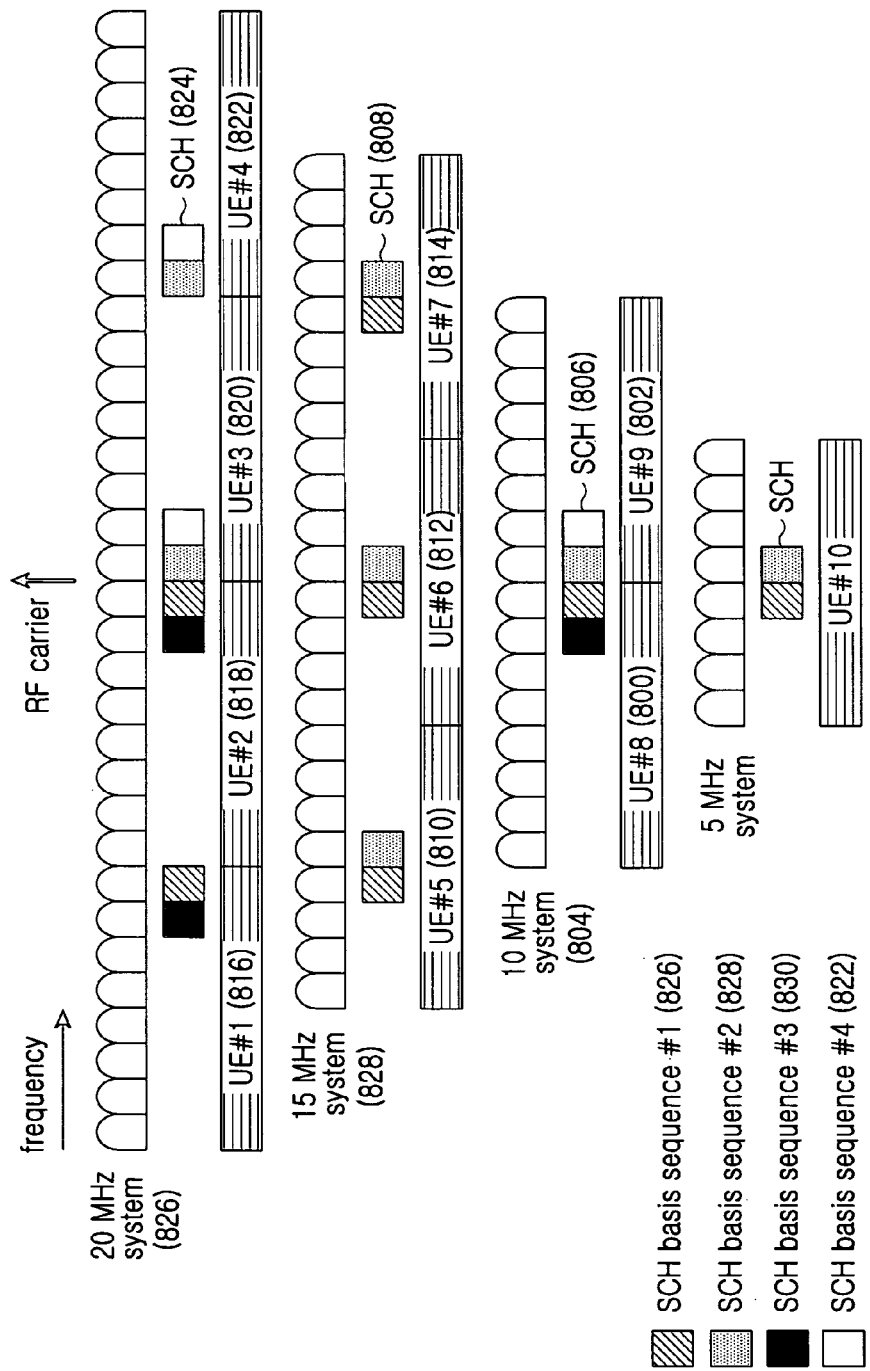
FIG. 8 illustrates an example where a plurality of UEs are assigned in the system bandwidth under the SCH structure according to the present invention.

FIG. 8 illustrates a situation where UEs having at least a 5-MHz reception bandwidth exist in each system band as in the situation of FIG. 7. Referring to FIGS. 7 and 8, for the 10-MHz system bandwidths 726 and 804, each cell transmits two basis sequences 712, 714; and 830, 832 in addition to two basis sequences 708, 710; and 826, 828 of the central 1.25-MHz band, so that a total of 2.5-MHz bandwidth is used for SCHs 718 and 806. As a result, as shown in FIG. 8, if UEs with 5-MHz bandwidth, for example, UE#8 (800) and UE#9 (802), exist in each half of the 10-MHz system band, UEs 800 and 802 can receive SCHs, i.e. SCH sequences, corresponding to the 1.25-MHz bandwidth from the neighboring cell.

For the 15-MHz system bandwidths 706 and 836, because it is preferable for UEs 810, 812 and 814 with 5-MHz reception bandwidth to be allocated such that they should not overlap each other in the 15-MHz system bandwidths 706 and 836 as shown in FIGS. 7 and 8, each cell transmits SCHs 716 and 808 in the 15-MHz system bandwidths 706 and 836 as shown in FIGS. 7 and 8. Specifically, the cells with 15-MHz system bandwidths 706 and 836 transmit three SCH sequences each composed of 2 basis sequences at a predetermined interval in such a way that they should not overlap each other, and for example, an interval between the SCHs is 6*0.625 MHz or 3.750 MHz. As a result, UEs 810, 812 and 814 can always perform cell search for the neighboring cell, using 1.25-MHz SCHs 716 and 808 transmitted in the central parts of their allocated 8-MHz reception bands. In FIG. 8, the patterns of the basis sequences 826 and 828 included in the SCH sequences transmitted for the UE#5 (810) and the UE#7 (814) are mere examples, and they can be replaced with other sequence patterns. The sequence patterns used in the band where UEs 810 and 814 are allocated, can be predefined between the system and the UEs.

For the 20-MHz system bandwidths 704 and 834, the Frequency domain mapping of SCHs is similar to that of the first embodiment. That is, if UEs 816, 818, 820 and 822 with 5-MHz reception bandwidth are allocated in the 20-MHz system bandwidths 704 and 8234 an SCH sequence composed of two basis sequences 830 and 826 is transmitted so that UE#2 (818) can receive an SCH in the uppermost 1.25-MHz region of the corresponding allocated lower half band. Further, an SCH sequence composed of two basis sequences 828 and 832 is transmitted so that the UE#3 (820) can receive an SCH in the lowermost 1.25-MHz region of the corresponding allocated upper half band.

For UE#1 (816) and UE#4 (822) allocated in both 5-MHz end bands of the system band, the two basis sequences 830 and 826 are additionally transmitted in the lower half band and the two basis sequences 828 and 832 are additionally transmitted in the upper half band, from the 4 basis sequences 830, 826, 828 and 832 transmitted in the central band at predetermined intervals. The patterns of basis sequences 830 and 826; 828 and 832 included in the SCH sequences additionally transmitted for UE#1 (816) and UE#4 (822) are mere examples, and they can be replaced with other sequence patterns. The sequence patterns used in the band where UEs 816 and 822 are allocated, can be predefined between the system and the UEs.

A further embodiment considers transmission of an SCH and another common channel, for example, Broadcast Channel (BCH) together. A description will be made where the reception bandwidth of a UE is 10 MHz in minimum, and the UE basically needs to receive an SCH with a 1.25-MHz bandwidth regardless of the system bandwidth. The BCH is a channel for transmitting information on the system and cell accessed by the UE (hereinafter referred to as "system information"), and after completion of the cell search, the UE accesses this channel first of all. By reading the BCH, the UE obtains system information necessary for receiving data channels and control channels, such as cell ID, system bandwidth, channel setup, and the like.

Figure 9:
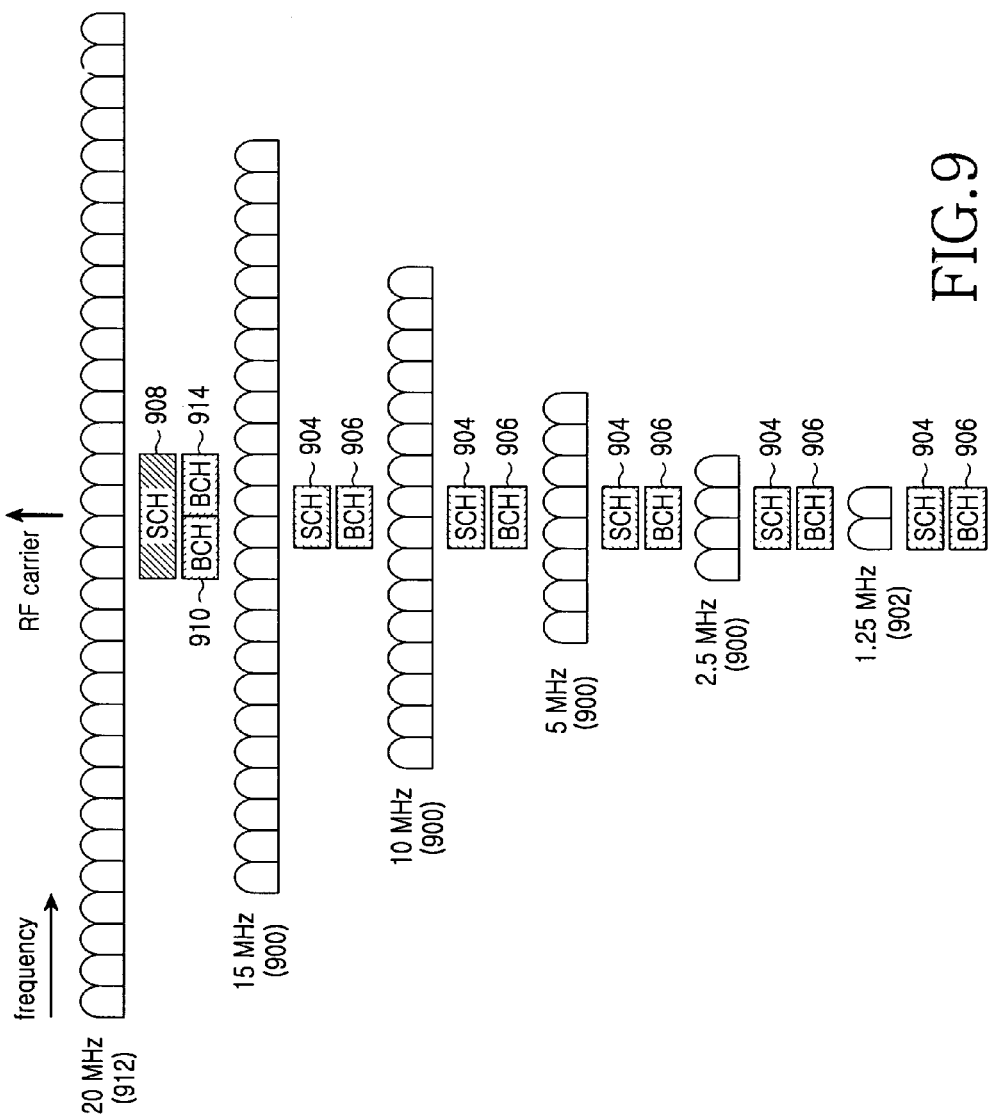
FIG. 9 illustrates Frequency resource mapping for SCHs and BCHs according to the present invention.

Referring to FIG. 9, cells using system bandwidths 900 of 1.25 MHz to 15 MHz transmit BCH information 906 including system and cell information in the same 1.25-MHz band as that of SCH 904. However, for the 20-MHz system bandwidth 912, BCH information 910 and 914 are transmitted through the same 2.5-MHz bandwidth as that of an SCH 908. That is, BCH information is repeatedly transmitted at the center of the system band. Therefore, both of UE#1 (612) and UE#2 (614) that have a 10-MHz reception bandwidth and are located in each half band of the system band as shown in FIG. 6, can receive BCH information on a BCH from the neighboring cell.

Therefore, like for UEs 612 and 614, for the UEs that receive broadcast service data like the Multimedia Broadcast and Multicast Service (MBMS) in an idle mode where they access no cell, or are located in the lower or upper half (10-MHz) band of the whole system band, the system transmits common channels different from the SCH, so that the UEs can perform cell search for the neighbor and acquire the system information of the neighboring cell.

Still another embodiment considers transmission of a Paging Channel (PCH) as another example of the common channel. The PCH is used when the system desires to page a UE in the idle mode (hereinafter referred to as an "idle mode UE") and set up a connection thereto. If a page message received through the PCH has information paging the UE itself, the UE starts a procedure for connecting with the system.

Figure 10:
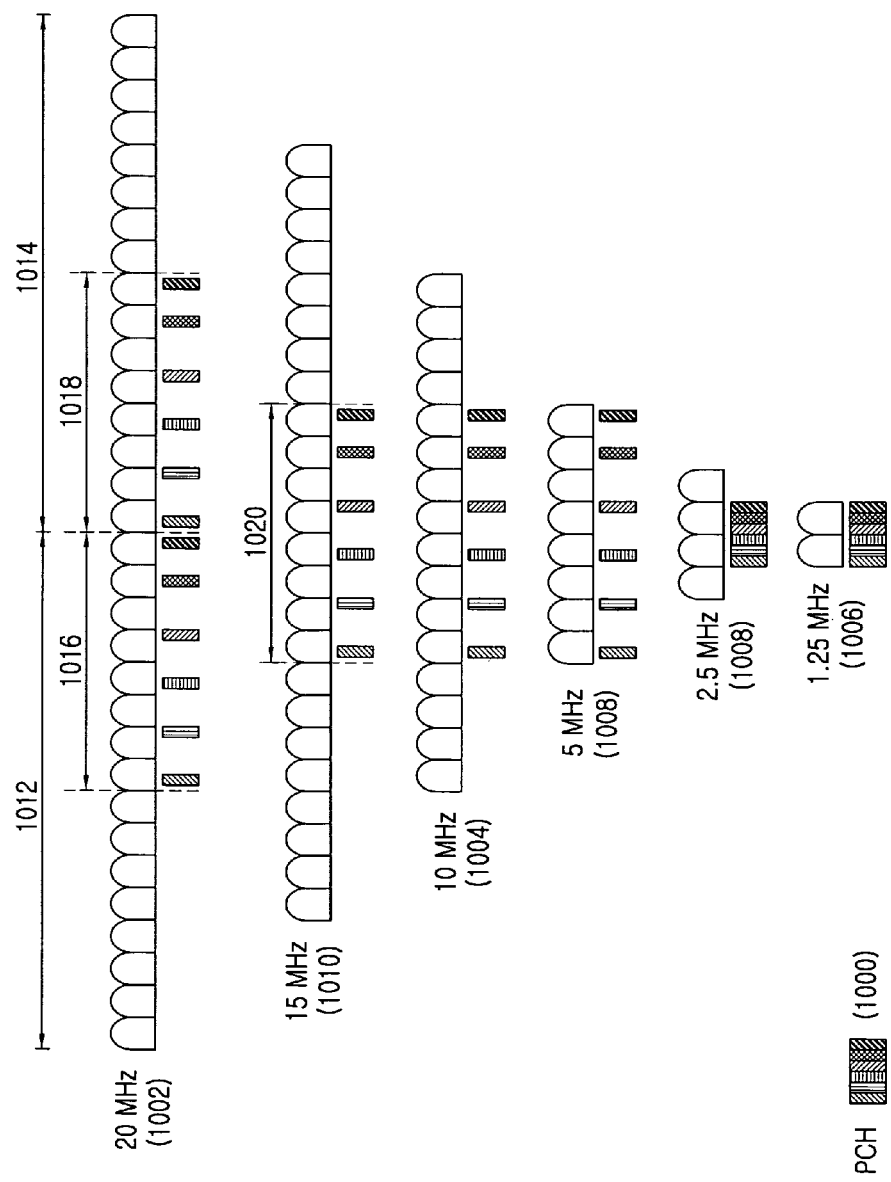
FIG. 10 illustrates Frequency resource mapping for PCHs according to the present invention.

Referring to FIG. 10, for the PCH, as its transmission band is not limited to the central 1.25-MHz band and a PCH message composed of a plurality of PCH subcarrier symbols 1000 is scattered over the whole system band during transmission, the transmission band of each PCH subcarrier symbol and the bandwidth occupied by the PCH message differ according to system bandwidth.

For the 1.25-MHz and 2.5-MHz system bandwidths 1006, PCH subcarrier symbols are concentratedly transmitted in the central 1.25-MHz band. For the 5-MHz and 10-MHz system bandwidths 1004, PCH subcarrier symbols are scattered in the central 5-MHz band during transmission. The PCH transmission bandwidth to which the PCH subcarrier symbols are mapped is not limited to 5 MHz. For example, for the system bandwidth, which is greater than or equal to 10 MHz, the PCH transmission bandwidth can be 10 MHz.

By scattering PCH subcarrier symbols in the broader Frequency domain in this manner during transmission, it is possible to increase Frequency diversity gain and thus improve the reception performance. The PCH is a channel that a UE receives after it completes cell search and system information acquisition through the SCH and the BCH. Therefore, if a method for transmitting the PCH has been previously determined as shown in FIG. 10, the UE receives the PCH subcarrier symbols through corresponding subcarriers according to a system bandwidth of the system that transmits the PCH.

For the 20-MHz system bandwidth 1002 and the 15-MHz system bandwidth 1010, Frequency domain mapping of the PCH is designed taking the scalable bandwidth into account. For the 20-MHz system bandwidth 1002, a UE with 10-MHz reception bandwidth is located in the upper or lower half (10-MHz) band 1012 or 1014 to receive MBMS data in the idle mode, and an idle mode UE that receives no MBMS data is located in the center of the system band. Therefore, the PCH message should be mapped in such a way that it can be received by both of the two different idle mode UEs. Therefore, for the 20-MHz system bandwidth 1002, the PCH message is repeatedly transmitted through two 5-MHz bands 1016 and 1018, which are adjacent to the center of the whole system band without overlapping. In this case, a UE located in the center of the system band can receive and combine both of the two PCH messages transmitted in both of the 5-MHz bands 1016 and 1018, thereby improving detection performance of the PCH message.

For the 15-MHz system bandwidth 1010, because an idle mode UE receiving MBMS data can be located in the 10-MHz band closer to the upper or lower band, the PCH message is transmitted in the central 5-MHz band 1020 of system band, taking into account both the UE located in the upper/lower 10-MHz band and the idle mode UE located in the central 10-MHz band of the system band.

In yet another embodiment, the Frequency domain mapping of the PCH can be equally applied not only to the PCH, but also to other common control channels that the idle mode UE needs to receive. For example, as illustrated in FIG. 11, the SCH and the BCH may have similar structures to that given by the foregoing Frequency domain mapping of the PCH.

Figure 11:
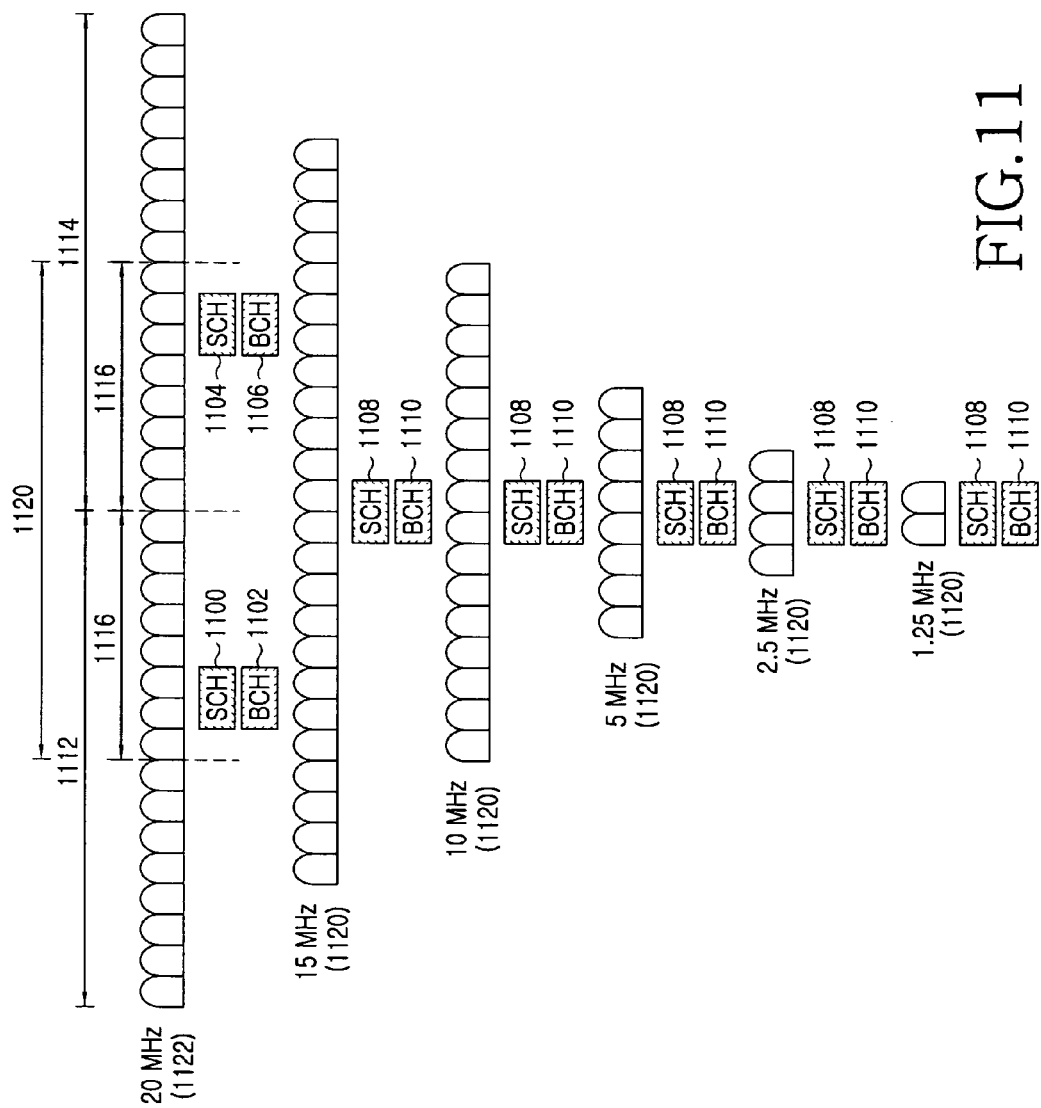
FIG. 11 illustrates Frequency resource mapping for SCHs and BCHs according to the present invention.

Referring to FIG. 11, for system bandwidth 1120 which is less than or equal to 15 MHz, an SCH 1108 and a BCH 1110 are transmitted in the central 1.25-MHz band of the system band. For the 20-MHz system bandwidth 1122, SCHs 1100 and 1104, and BCHs 1102 and 1106 are transmitted in the lower 5-MHz band 1116 adjacent to the center and the upper 5-MHz band 1118 adjacent to the center, respectively. Then a UE with 10-MHz reception bandwidth located in the central 10-MHz band of the system band receives all of SCHs 1100 and 1104 and BCHs 1102 and 1106 transmitted in the 1.25-MHz bands in both of 5-MHz bands 1116 and 1118 adjacent to the center, thereby obtaining superior cell search performance and BCH decoding performance. The UE acquires synchronization to the system by detecting at least one of two SCHs 1110 and 1104 while performing initial cell search, and if the UE is located in any half (10-MHz) band 1112 or 1114 for communication, it performs cell search by detecting the SCHs 1110 and 1104 in the corresponding half band 1112 or 1114.

Because SCHs 1100, 1104 and 1108 are composed of the same sequences regardless of the system bandwidth, the UE, even though it has no information on the system bandwidth, can perform cell search as UE knows the sequences it desires to detect.

Figure 12:
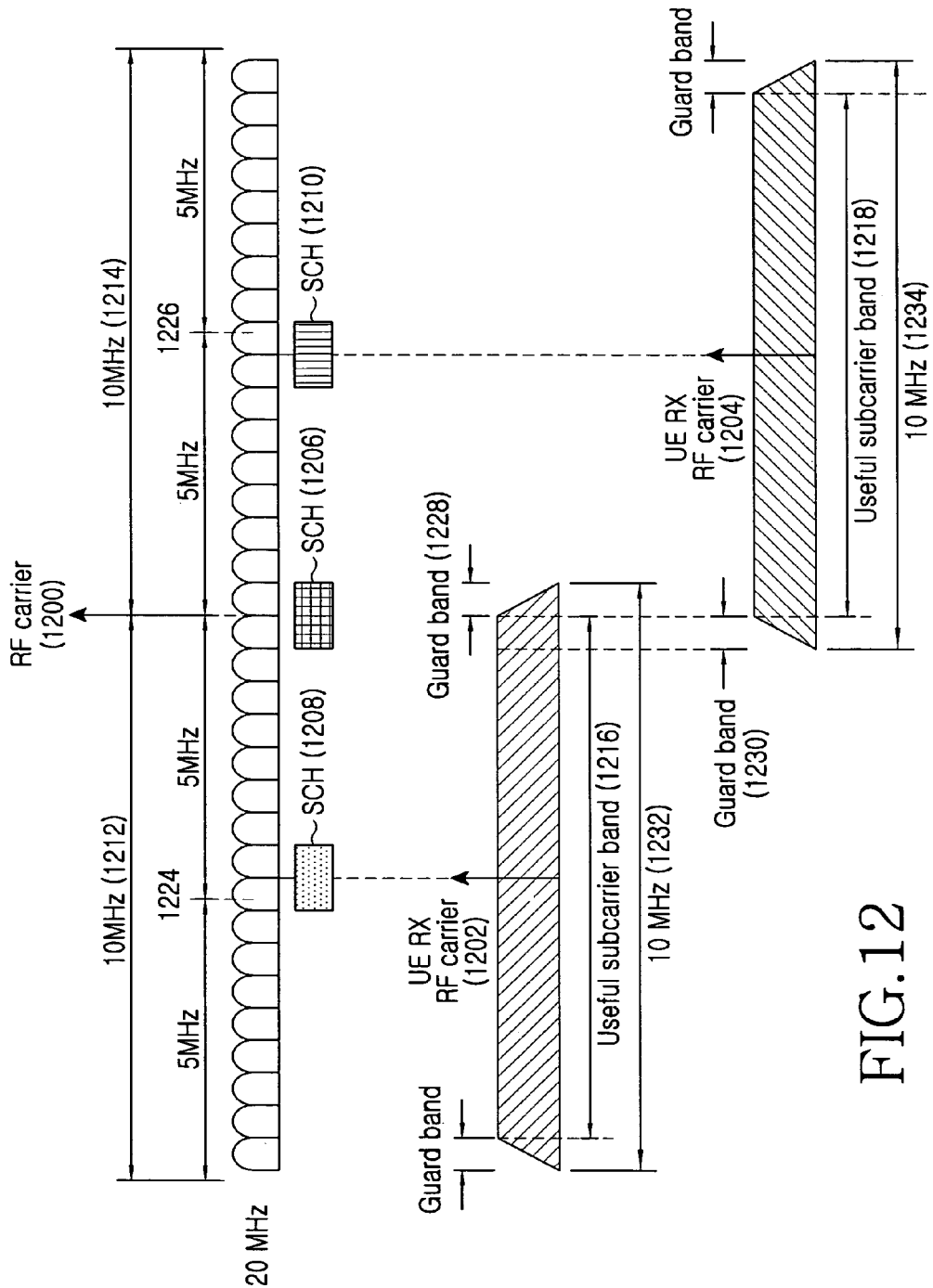
FIG. 12 illustrates Frequency resource mapping for SCHs according to the present invention.

Another embodiment provides an SCH transmission method for allowing a UE to perform a low complexity cell search for a neighboring cell, on the assumption that a reception bandwidth of the UE, allowed in the system band, is 10 MHz in minimum. For this implementation, SCH Frequency domain mapping for the 20-MHz system bandwidth is shown in FIG. 12. For the system bandwidth which is less than or equal to 10 MHz, the Frequency domain mapping shown in FIG. 5, can be applied in the same way.

This implementation allows the UE to perform a low complexity cell search for the neighboring cell, when a UE with 10-MHz reception bandwidth is located in each half band, i.e. the lower 10-MHz band 1212 or the upper 10-MHz band 1214, of the 20-MHz whole system band.

Referring to FIG. 12, an SCH 1206 arranged in the central 1.25-MHz band of the system bandwidth is used for initial cell search by the UE, and SCHs 1208 and 1210, which are spaced from SCH 1206 arranged in the central band by a predetermined interval and arranged in the 1.25-MHz band in each half band, are used for cell search for the neighboring cell, when the UE with 10-MHz reception bandwidth is located in the lower 10-MHz band 1212 or the upper 10-MHz band 1214. SCH 1206 in the central band can be used even when the UE with 20-MHz reception bandwidth performs cell search for the neighboring cell. SCHs 1206, 1208 and 1210 all can be composed of the same sequences or different sequences. As another example, SCHs 1206, 1208 and 1210 can have different bandwidths as shown in FIG. 8.

Preferably, reception RF carriers 1202 and 1204 of the UE with 10-MHz reception bandwidth are identical to the central frequencies of the bands occupied by SCH 1208 and SCH 1210, respectively. The reception RF carriers 1202 and 1204 indicating the center of the reception band of the UE are generally located in the centers of the valid reception bands 1216 and 1218 of the UE.

If an SCH is located in the center of the valid reception band, the UE can perform cell search by receiving only the SCH from the neighboring cell using a baseband filter having the same bandwidth as that of the SCH when the UE performs cell search for the neighboring cell. On the contrary, like for UE#1 (612) and UE#2 (614) of FIG. 6, or UE#1 to UE#4 816, 818, 820 and 822 of FIG. 8, if SCHs are not located in the center of the valid reception band of the UE, in order to receive the SCHs from the neighbor cell and perform cell search using the received SCHs, the UE should filter (bandpass) the received signals or down-convert the received signal so that the SCHs are located in the baseband, thereby causing an increase in cell search complexity.

Reception RF carriers 1202 and 1204 of UEs located in the lower and upper 10-MHz bands 1212 and 1214 may not be identical to the center frequencies 1224 and 1226 of the lower and upper 10-MHz bands 1212 and 1214. The reason is because guard bands 1228 and 1230 may overlap between 10-MHz reception bands 1232 and 1234 of UEs located in the lower or upper 10-MHz band 1212 or 1214.

Generally, the cellular communication system defines a Frequency pectrum, and in order to allow a UE to smoothly perform cell search, the system allows an RF carrier 1200 of the downlink signal transmitted by a transmitter of a Node B to exist in the Frequency spectrum. For the WCDMA system, because the Frequency spectrum has a 200-KHz interval, a UE performs cell search by changing a Frequency of the reception RF carrier in units of 200 KHz, when it is powered on. For successful cell search, the Frequency of the reception RF carrier should be identical to a Frequency of an RF carrier of the transmitter. In FIG. 11, because SCH 1100 and 1104 are used for the purpose of initial cell search, the corresponding center Frequency exists in the Frequency spectrum.

However, in FIG. 12, although SCH 1206 in the central band can be used for initial cell search as its center frequency is identical to RF carrier 1200 of the transmitter, SCHs 1208 and 1210 in both side bands can hardly be used for initial cell search as it is not guaranteed that their center frequencies exist in the Frequency spectrum. Therefore, with the use of the channel structure of FIG. 12, the UE can perform low complexity neighboring cell search, by using SCH 1206 in the central band for initial cell search, and applying baseband filtering to received signals for detecting SCH 1208 or 1210 when it is located in the lower or upper 10-MHz band 1212 or 1214 after the initial cell search. In addition, it is possible to prevent SCHs 1208 and 1210 from being searched during initial cell search, by allocating sequences different from that of SCH 1206 to SCHs 1208 and 1210, in case that SCHs 1208 and 1210 exist in the frequency spectrum. However, if the UE with a 20-MHz reception bandwidth is camping in the whole 20-MHz system band, the UE can smoothly perform cell search for the neighboring cell by applying baseband filtering to the received signal in the central band.

Figure 13:
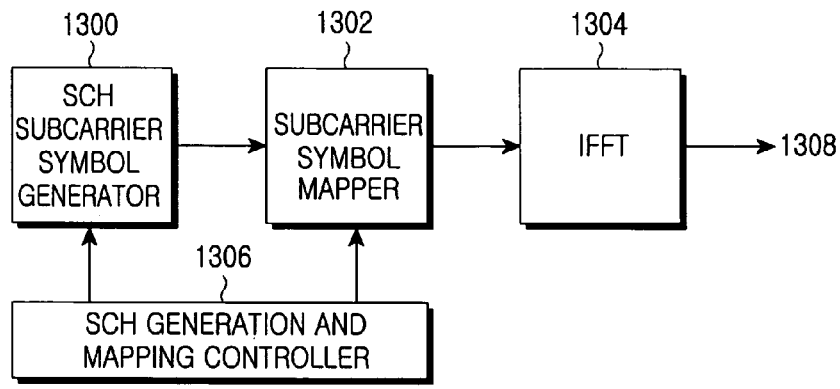
FIG. 13 is a block diagram showing the structure of a transmitter according to the present invention.

Referring to FIG. 13, an SCH subcarrier symbol generator 1300, under the control of an SCH generation and mapping controller 1306, generates corresponding SCH subcarrier symbols according to a system bandwidth. If the SCH structure according to the embodiment shown in FIG. 5 is applied, for the system bandwidth which is less than or equal to 15 MHz, subcarrier symbols for SCH basis sequences 508 and 510 transmitted in the central 1.25-MHz band of the whole system band are generated, and for the 20-MHz system bandwidth, subcarrier symbols for SCH basis sequences 512, 508, 510 and 514 transmitted in the 2.5-MHz band are generated. If the SCH structure according to the embodiment shown in FIG. 12 is applied, subcarrier symbols for three SCH sequences 1206, 1208 and 1210 located in the central 1.25-MHz band of the whole 20-MHz system band and the central 1.25-MHz bands of both 10-MHz end bands are generated.

The generated SCH subcarrier symbols are applied to corresponding input ports of an Inverse Fast Fourier Transform (IFFT) unit 1304 through a subcarrier symbol mapper 1302, and then transmitted together with other subcarrier symbols in the same OFDM symbol (see 1308).

Figure 14:
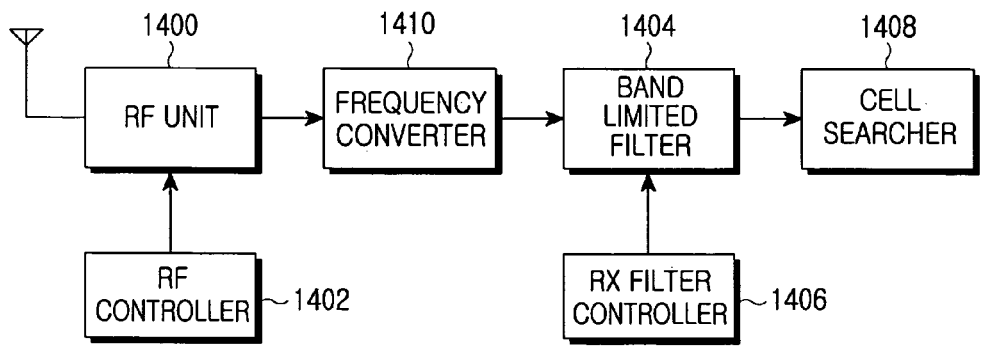
FIG. 14 is a block diagram showing the structure of a receiver according to the present invention.

Referring to FIG. 14, an RF controller 1402 controls a reception RF carrier according to the system band where the UE should camp, and an RF unit 1400 receives a radio signal according to the reception RF carrier controlled by the RF controller 1402. The radio signal received from the RF unit 1400 is down-converted into an Intermediate Frequency (IF) or baseband signal by a Frequency converter 1410. A band-limited filter 1404 removes from the down-converted signal the frequency component other than the SCH band for the cell for which a search will be performed. The pass-band of band-limited filter 1404 and the bandwidth are determined according to the system bandwidth and the band to which the UE belongs, under the control of a reception filter controller 1406.

According to the SCH structure of the embodiment of the present invention shown in FIG. 6, for example, for UE#1 (612) that is camping in the lower 10-MHz band of the 20-MHz system bandwidth, the band-limited filter 1404 receives a signal in the uppermost 1.25-MHz band of the lower 10-MHz band for UE#1 (612), thereby receiving only the SCH signal belonging to the band and removing the signal existing in the other bands. If the SCH structure according to the embodiment of the present invention shown in FIG. 12 is applied, the band-limited filter 1404 operates as a baseband filter with 1.25-MHz bandwidth regardless of whether the UE is camping in the central 10-MHz band or any one of both 10-MHz bands of the 20-MHz system band, thereby filtering the baseband signal provided from frequency converter 1410 with the 1.25-MHz bandwidth. As a result, only SCHs 1206, 1208 and 1210 located in the central band of the 10-MHz band where the UE is camping are received, and the signals belonging to the other bands are removed. The SCH signals that have passed through band-limited filter 1404 are input to a cell searcher 1408, and cell searcher 1408 detects SCH sequences included in the SCH signals and performs cell search using the detected SCH sequences.

Figure 15:
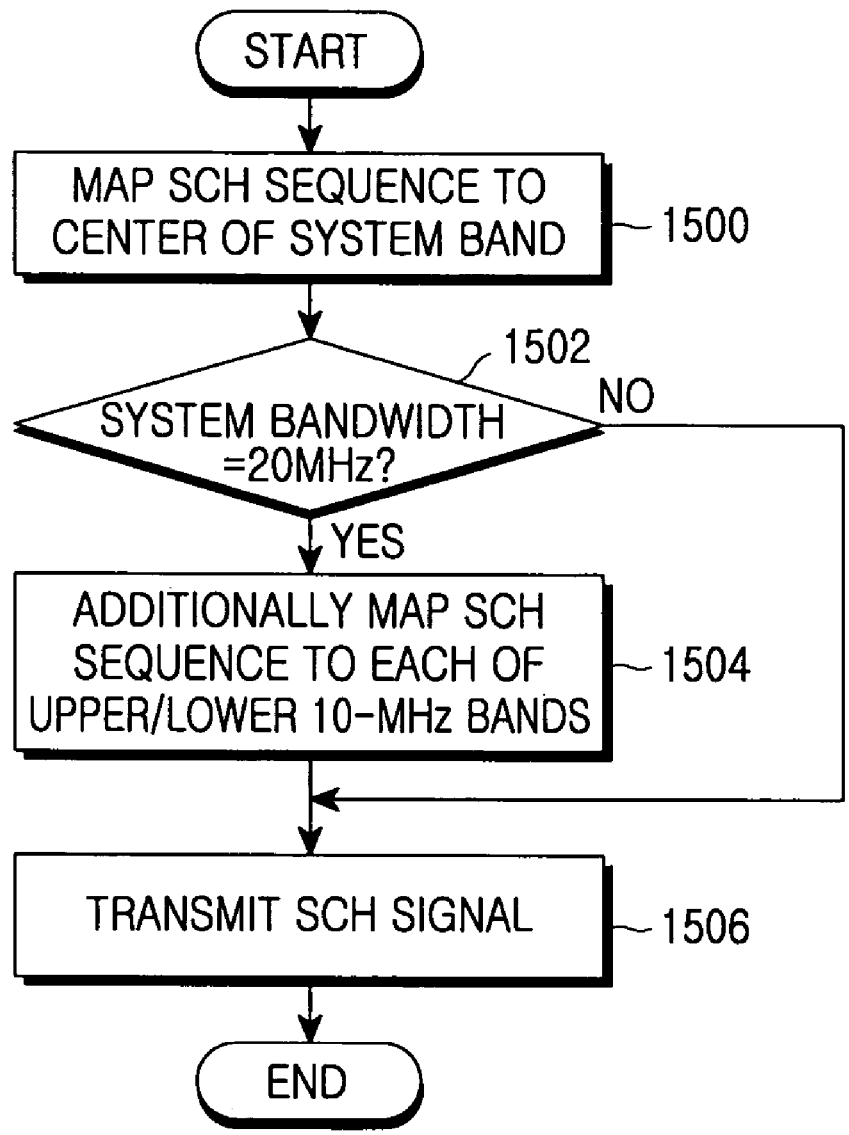
FIG. 15 is a flow chart of an operational procedure of a transmitter according to the present invention.

Referring to FIG. 15, in step 1500, the transmitter maps an SCH sequence to the central 1.25-MHz band of the system band regardless of the system bandwidth. In step 1502, the transmitter checks the system bandwidth. If the system bandwidth is 20 MHz, the transmitter additionally maps an SCH sequence to the 1.25-MHz band in each of the upper and lower 10-MHz bands in step 1504.

In the SCH structure according to the embodiment of the present invention shown in FIG. 5, one SCH basis sequence is additionally mapped to each of both 0.675-MHz bands adjacent to the central 1.25-MHz band. In the SCH structure according to the embodiment of the present invention shown in FIG. 12, an SCH sequence is additionally mapped to the central 1.25-MHz band in a 10-MHz reception band of the UE that will camp in each of the upper and lower 10-MHz bands. Because the position of a guard band to be used in the reception 10-MHz band is predetermined, the position of the SCH sequence to be additionally mapped in the frequency domain is already known to the transmitter.

If the SCH mapping is completed, the mapped SCH sequences are converted into the same OFDM symbols as the signals on the other channels, and then transmitted together in step 1506. If it is determined in step 1502 that the system bandwidth is not 20 MHz, step 1504 can be omitted, and the transmitter proceeds to step 1506.

Figure 16:
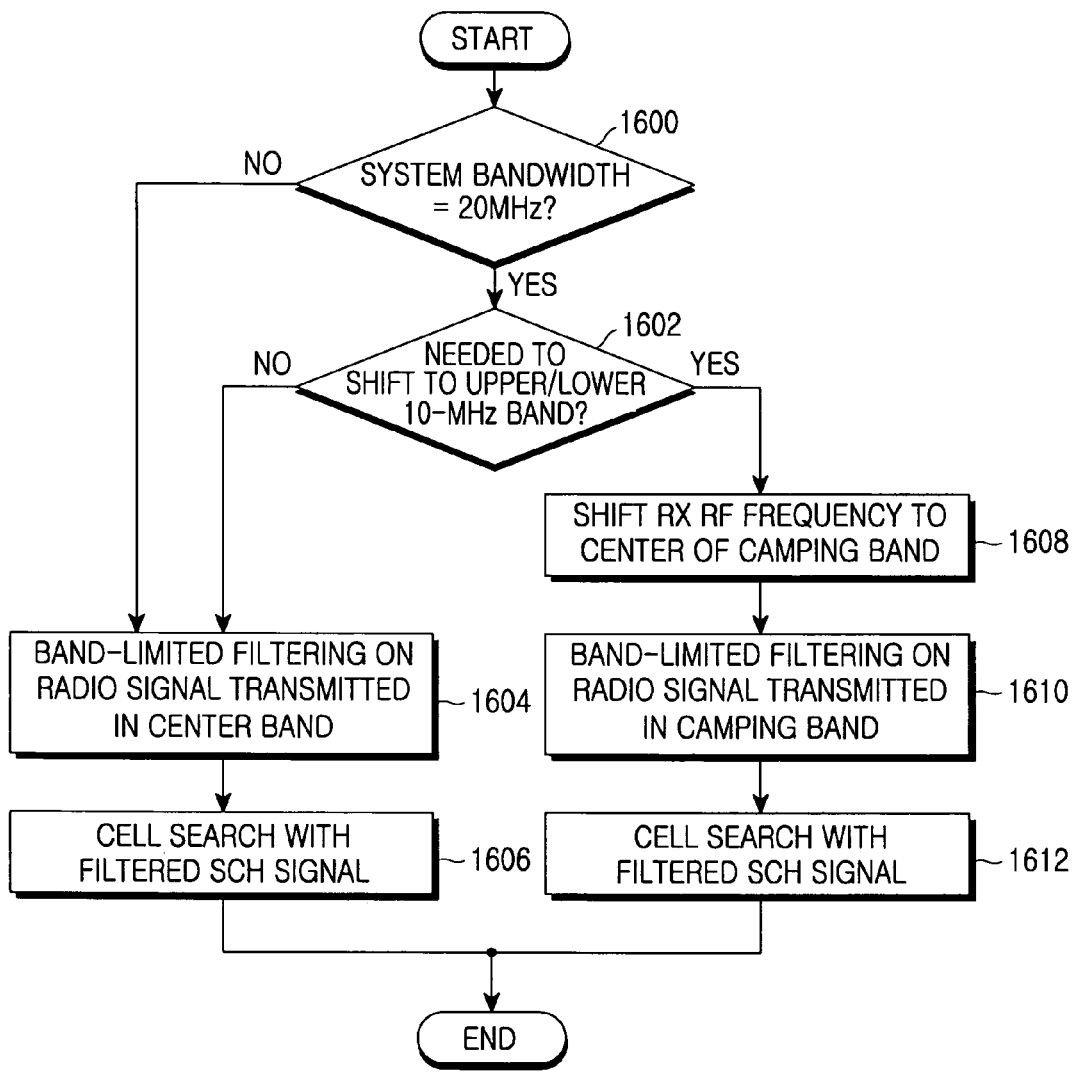
FIG. 16 is a flow chart of an operational procedure of a receiver according to the present invention.

Referring to FIG. 16, the UE checks a system bandwidth of its current cell in step 1600. If the system bandwidth is 20 MHz, the UE determines in step 1602 if there is a need to shift to the upper or lower 10-MHz band. If it is determined in step 1602 that the UE is camping in the central 10-MHz band of the system band, or if it is determined in step 1600 that the system bandwidth is less than 20 MHz, the UE extracts an SCH signal in the 1.25-MHz band including SCH sequences by applying, to the received signal, a band-limited filter for the central 1.25-MHz band of the system band in step 1604, and then performs cell search using the SCH signal output from the band-limited filter in step 1606.

If the system bandwidth is 20 MHz and the UE is camping in the lower or upper 10-MHz band, the UE shifts a reception RF carrier to the center of the corresponding 10-MHz band in step 1608. Thereafter, in step 1610, the UE receives a radio signal transmitted in its camping 10-MHz band, and extracts a 1.25-MHz band SCH signal including SCH sequences by applying the band-limited filter to the received radio signal in order to remove the signals other than the SCH. In step 1612, the UE performs cell search using the SCH signal output from the band-limited filter.

As can be understood from the foregoing description, in the cellular wireless communication system supporting a scalable bandwidth, the present invention allows a UE with a reception bandwidth less than the system bandwidth to always receive an SCH from a neighboring cell while maintaining the low SCH overhead, thereby facilitating fast cell search and handover. In addition, there is no need for an agreement on the neighboring cell measurement time between the UE and its current Node B for the neighboring cell search, thus contributing to simplification of the system and UE operations.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method for transmitting a common channel in a cellular communication system that supports a scalable system bandwidth and uses multiple access technology, the method comprising:
   determining a system bandwidth of a cell and a reception bandwidth of User Equipments (UEs) located in the cell;
   mapping a first synchronous channel (SCH) sequence to a central band of a system band, which has a system bandwidth which is greater than or equal to a minimum bandwidth required for detecting an SCH;
   additionally mapping second SCH sequences to bands having the minimum bandwidth, each of which is spaced from the central band by a predetermined interval, if the system bandwidth is greater than twice the reception bandwidth; and
   transmitting a signal in a Frequency domain to which at least one of the first SCH sequence and the second SCH sequences is mapped, to the UEs located in the cell.

2. The method of claim 1, wherein a center frequency of the band to which each of the second SCH sequences is mapped is identical to a reception Radio Frequency (RF) carrier of a UE that is allocated any one of an upper half band and a lower half band of the system band.

3. The method of claim 1, wherein if the system bandwidth is an even multiple of the reception bandwidth, the first SCH sequence is mapped to the central band of the system band, which is at least twice the minimum bandwidth.

4. The method of claim 1, wherein if the system bandwidth is an odd multiple of the reception bandwidth, the first SCH sequence is mapped to the central band of the system band, which has the minimum bandwidth.

5. The method of claim 1, wherein the SCH sequences are mapped in the system band in such a way that a UE using the reception bandwidth allocated in the system band can receive at least one of the SCH sequences through a band corresponding to at least the minimum bandwidth regardless of the system bandwidth.

6. The method of claim 1, wherein the second SCH sequences are composed of SCH subcarrier symbols, some of which are equal to those of the first SCH sequences.

7. The method of claim 1, further comprising mapping broadcast channel (BCH) information including system and cell information to the bands to which the SCH sequences are mapped.

8. The method of claim 7, wherein if the system bandwidth is an even multiple of the reception bandwidth, the BCH information is repeated at least twice, and then mapped to the central band of the system band.

9. The method of claim 1, further comprising:
repeating and mapping a paging channel (PCH) message for paging a UE in an idle mode in two bands that are adjacent to the central band of the system band and have a maximum PCH bandwidth required for transmitting a PCH message for paging a UE in an idle mode, if the system bandwidth is greater than or equal to twice the reception bandwidth;
mapping the PCH message in the central band of the system band, if the system bandwidth is less than twice the reception bandwidth; and
transmitting a signal in the Frequency domain to which the PCH message is mapped, to the UEs located in the cell.

10. The method of claim 9, wherein if the system bandwidth is greater than or equal to the maximum PCH bandwidth, PCH subcarrier symbols constituting the PCH message are scatteredly mapped all over the band to which the PCH message is mapped; and
mapping in a high concentration in the central band of the system band the PCH subcarrier symbols, if the system bandwidth is less than the maximum PCH bandwidth.

11. An apparatus for transmitting a common channel in a cellular communication system that supports a scalable system bandwidth and uses multiple access technology, the apparatus comprising:
a controller for determining a system bandwidth of a cell and a reception bandwidth of User Equipments (UEs) located in the cell;
a synchronous channel (SCH) subcarrier symbol generator for generating a first and in the alternative a second SCH sequence composed of a plurality of SCH subcarrier symbols according to the system bandwidth;
a subcarrier symbol mapper for mapping the first SCH sequence to a central band of the system band, which has a bandwidth that is greater than or equal to a minimum bandwidth required for detecting an SCH, and additionally mapping second SCH sequences to bands that are spaced from the central band and have the minimum bandwidth, if the system bandwidth is greater than twice the reception bandwidth; and
an Inverse Fast Fourier Transform (IFFT) unit for transmitting a signal in a frequency domain to which at least one of the first SCH sequence and the second SCH sequences is mapped, to the UEs located in the cell.

12. The apparatus of claim 1, wherein a center frequency of the band to which each of the second SCH sequences is mapped is identical to a reception Radio Frequency (RF) carrier of a UE that is allocated in any one of an upper half band and a lower half band of the system band.

13. The apparatus of claim 11, wherein if the system bandwidth is an even multiple of the reception bandwidth, the first SCH sequence is mapped to the central band of the system band, which is at least twice the minimum bandwidth.

14. The apparatus of claim 11, wherein if the system bandwidth is an odd multiple of the reception bandwidth, the first SCH sequence is mapped to the central band of the system band, which has the minimum bandwidth.

15. The apparatus of claim 11, wherein the SCH sequences are mapped in the system band in such a way that a UE using the reception bandwidth allocated in the system band can receive at least one of the SCH sequences through a band corresponding to at least the minimum bandwidth regardless of the system bandwidth.

16. The apparatus of claim 11, wherein the second SCH sequences are composed of SCH subcarrier symbols, some of which are equal to those of the first SCH sequences.

17. The apparatus of claim 11, wherein the subcarrier symbol mapper further maps broadcast channel (BCH) information including system and cell information to the bands to which the SCH sequences are mapped.

18. The apparatus of claim 17, wherein if the system bandwidth is an even multiple of the reception bandwidth, the BCH information is repeated at least twice, and then mapped to the central band of the system band.

19. The apparatus of claim 11, wherein the subcarrier symbol mapper:
repeats and maps a paging channel (PCH) message for paging a UE in an idle mode in two bands that are adjacent to the central band of the system band and have a maximum PCH bandwidth required for transmitting a PCH message for paging a UE in an idle mode, if the system bandwidth is greater than or equal to double of the reception bandwidth; and
maps the PCH message in the central band of the system band, if the system bandwidth is less than double of the reception bandwidth.

20. The apparatus of claim 19, wherein if the system bandwidth is greater than or equal to the maximum PCH bandwidth, PCH subcarrier symbols constituting the PCH message are scatteredly mapped all over the band to which the PCH message is mapped;
wherein if the system bandwidth is less than the maximum PCH bandwidth, the PCH subcarrier symbols are concentratedly mapped in the central band of the system band.

21. A method for transmitting a common channel in a cellular communication system that supports a scalable system bandwidth and uses multiple access technology, the method comprising:
determining a system bandwidth of a cell and a reception bandwidth of User Equipments (UEs) located in the cell;
repeating and mapping a Paging Channel (PCH) message for paging a UE in an idle mode in two bands, each of which is adjacent to a center frequency of the system band and has a maximum PCH bandwidth required for transmitting a PCH message for paging a UE in an idle mode, if the system bandwidth is greater than or equal to twice the reception bandwidth; and
transmitting a signal in a frequency domain to which the PCH message is mapped, to UEs located in the cell.

22. The method of claim 21, further comprising:
mapping the PCH message in a central frequency band of the system band, if the system bandwidth is less than twice the reception bandwidth.

23. The method of claim 21, wherein if the system bandwidth is greater than or equal to the maximum PCH bandwidth, PCH subcarrier symbols constituting the PCH message are scatteredly mapped all over the band to which the PCH message is mapped;
wherein the PCH subcarrier symbols are mapped in a high concentration in the central band of the system band if the system bandwidth is less than the maximum PCH bandwidth.

24. An apparatus for transmitting a common channel in a cellular communication system that supports a scalable system bandwidth and uses multiple access technology, the apparatus comprising:
- a controller for determining a system bandwidth of a cell and a reception bandwidth of User Equipments (UEs) located in the cell;
- a subcarrier symbol mapper for repeating and mapping a Paging Channel (PCH) message for paging a UE in an idle mode in two bands, each of which is adjacent to a center frequency of the system band and has a maximum PCH bandwidth required for transmitting a PCH message for paging a UE in an idle mode, if the system bandwidth is greater than or equal to twice the reception bandwidth; and
- an Inverse Fast Fourier Transform (IFFT) unit for transmitting a signal in a frequency domain to which the PCH message is mapped, to UEs located in the cell.

25. The apparatus of claim 24, wherein the subcarrier symbol mapper maps the PCH message in a central frequency band of the system band, if the system bandwidth is less than twice the reception bandwidth.

26. The apparatus of claim 24, wherein if the system bandwidth is greater than or equal to the maximum PCH bandwidth, PCH subcarrier symbols constituting the PCH message are scatteredly mapped all over the band to which the PCH message is mapped;
- wherein the PCH subcarrier symbols are mapped in a high concentration in the central band of the system band if the system bandwidth is less than the maximum PCH bandwidth.

* * * * *